United States Patent [19]

Kimura

[11] Patent Number: 4,771,475
[45] Date of Patent: Sep. 13, 1988

[54] IMAGE SCANNER

[75] Inventor: Kiyoshi Kimura, Kogota, Japan

[73] Assignee: Alps Electric Co., Ltd., Japan

[21] Appl. No.: 85,535

[22] Filed: Aug. 14, 1987

[30] Foreign Application Priority Data

Nov. 13, 1986 [JP] Japan .......................... 61-173304[U]

[51] Int. Cl.[4] .............................................. G06K 9/22
[52] U.S. Cl. ........................................ 382/59; 382/48; 382/61; 33/140; 340/709
[58] Field of Search ...................... 382/48, 59, 61, 65; 340/709, 710, 720; 33/138, 139, 140

[56] References Cited

U.S. PATENT DOCUMENTS

| 3,541,248 | 11/1970 | Young | 178/6.6 |
| 3,584,142 | 6/1971 | Schoeffler | 340/720 |
| 3,832,485 | 8/1974 | Pieters | 340/707 |
| 4,242,574 | 12/1980 | Grant | 33/140 |
| 4,268,179 | 5/1981 | Long et al. | 382/68 |
| 4,581,761 | 4/1986 | Ichinokawa et al. | 382/59 |

Primary Examiner—Leo H. Boudreau
Assistant Examiner—Donald J. Daley
Attorney, Agent, or Firm—Guy W. Shoup; Paul J. Winters; Leighton K. Chong

[57] ABSTRACT

In an image scanner including an original bed, a feeding means for feeding an original placed on the original bed, and an image sensor adapted to be scanned across the original in a direction perpendicular to a paper feeding direction of the original; the improvement comprising a pointer adapted to be moved in parallel to a plane of the original and point a scan starting position and a scan ending position on the original, an encoder for detecting a quantity of movement of the pointer, and a setting means for setting the scan starting position and the scan ending position according to an output signal from the encoder.

1 Claim, 3 Drawing Sheets

IMAGE SCANNER

BACKGROUND OF THE INVENTION

The present invention relates to an image scanner including an image sensor adapted to scan information such as characters and figures of an original.

Generally, an image scanner is used for the purpose of conducting an image forming processing to indicate information such as characters and figures of an original by a display device in connection with a personal computer or the like. Such a conventional image scanner includes a line image sensor such as an optical sensor adapted to be scanned in a direction perpendicular to a feeding direction of the original during feeding the original in a body of the image scanner, thereby scanning the information such as characters and figures of the original.

In the case of limiting a scan image of the original, that is, scanning a limited area of the original or a specific portion of the original, a predetermined position on the original is set as an origin, and a scan starting position and a scan ending position on the original are measured with respect to the origin. Then, coordinates of the scan starting position and the scan ending position are stored in a control device such as a host computer according to the result of such measurement. The image sensor and an original feeding means are controlled to be operated according to the data regarding such a scan range.

However, in the prior art system as mentioned above, after the scan starting position and the read ending position are measured, such measured values must be inputted as the coordinates to the host computer or the like. In this manner, a designating operation of the scan range in the original is rendered very cumbersome.

SUMMARY OF THE INVENTION

It is an object of the present invention to provide an image scanner which may make easy the designation of a scan range in an original with a simple construction.

According to the present invention, there is provided in an image scanner including an original bed, a feeding means for feeding an original placed on the original bed, and an image sensor adapted to be scanned across the original in a direction perpendicular to a paper feeding direction of the original; the improvement comprising a pointer adapted to be moved in parallel to a plane of the original and point a scan starting position and a scan ending position on the original, an encoder for detecting a quantity of movement of the pointer, and a setting means for setting the scan starting position and the scan ending position according to an output signal from the encoder.

In operation, when the pointer is moved to the scan starting position on the original, a quantity of movement of the pointer is detected by the encoder. Then, the setting means is operated to obtain a scan starting position signal from an output signal from the encoder according to the quantity of movement of the pointer to the scan starting position. Next, the pointer is further moved to the scan ending position, and the setting means is operated at the scan ending position to obtain a scan ending position signal according to an output signal from the encoder. Thus, a scan range of the original is designated in a control device.

Then, the feeding means is operated to feed the original on the original bed, and simultaneously the image sensor is operated to read the original. In the case of designating the scan starting position and the scan ending position in the transverse direction of the original, the signal processing is conducted such that only the data is made effective between a bit of the image sensor located at a position corresponding to the scan starting position and another bit located at a position corresponding to the scan ending position. On the other hand, in the case of designating a scan range in the feeding direction of the paper, the image sensor is operated only in a limited area between the scan starting position and the scan ending position, and it is maintained inoperative in an area other than such a limited area. Further, the scanning of an image in a desired area may be carried out quickly by increasing a paper feeding speed when the image sensor is inoperative.

Generally, the image scanner is provided with a secondary scan encoder for detecting and counting a quantity of feed of the original in the feeding means. Accordingly, the secondary scan encoder may be utilized as an encoder for designating a scan range. Alternatively, another encoder having the same function as such a scan range designating encoder may be provided. In such cases, the signal processing regarding the designation of the scan range in the paper feeding direction may be made easy.

Other objects and features of the invention will be more fully understood from the following detailed description and appended claims when taken with the accompanying drawings.

DETAILED DESCRIPTION OF THE PREFERRED EMBODIMENT

Figure 1:
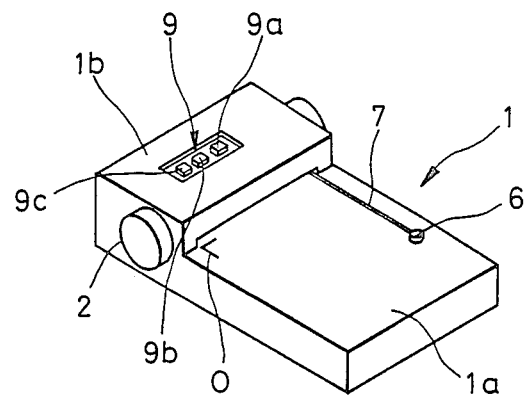
FIG. 1 is a perspective view of the image scanner of a preferred embodiment according to the present invention.
Figure 2:
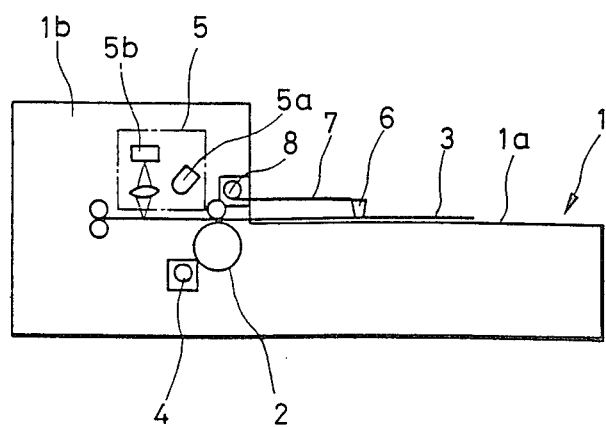
FIG. 2 is a schematic illustration showing the construction of the image scanner shown in FIG. 1.

Referring to FIGS. 1 and 2, reference numeral 1 generally designates a scanner body of the image scanner according to the present invention. The scanner body 1 includes an original bed 1a and a scanning section 1b formed in the front position of the original bed 1a. A paper feeding roller 2 as a feeding means is provided in the scanning section 1b to feed an original 3. An encoder 4 for secondary scan, that is, for detecting a quantity of forward movement of the original 3 is attached to the paper feeding roller 2. The encoder 4 is designed to generate a synchronizing signal every time the original 3 is fed one scan line upon reading the original 3. The scanning section 1b is equipped with a reflection type image sensor 5 comprising a light emitter array 5a such as a light emitting diode and a sensor array 5b such as an optical sensor. The image sensor 5 is designed to scan the original 3 and scan the information such as characters and figures on the original 3.

Figure 3:
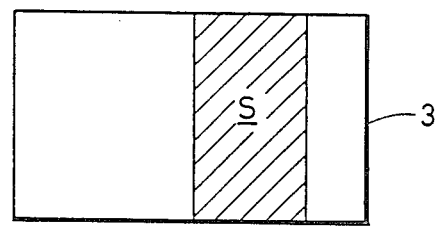
FIG. 3 is an illustration showing a scan range of an original.

The image sensor 5 is capable of scanning the information in a limited range of the original. That is, the image scanner does not scan the entire range of the original, but is may scan only a predetermined area S of the original 3 along the paper feeding direction as shown in FIG. 3.

There is provided a scan range designating mechanism for designating a scan range of the original 3. The scan range designating mechanism includes a pointer 6 adapted to be moved manually on the original bed 1a in the paper feeding direction, a wire 7 connected at its one end to the pointer 6, and a scan range designating encoder 8 connected to the other end of the wire 7. The scan range designating encoder 8 has substantially the same construction as of the secondary scan encoder 4. The wire 7 is normally wound up around the encoder 8, and the pointer 6 is therefore positioned at an origin O of the original 3. When the pointer 6 is manually moved in the paper feeding direction of the original 3, a quantity of extension of the wire 7 is converted into a quantity of rotation of the encoder 8, and the position of the pointer 6 is measured according to the quantity of rotation of the encoder 8. Further, when the tensile force applied to the pointer 6 is eliminated, the wire 7 is again wound up around the encoder 8 to return the pointer 6 to the origin O.

The scanning section 1b is provided with a switch section 9 having a plurality of switches 9a, 9b and 9c. The switches 9a, 9b and 9c are a start switch, a mode designating switch and a scan range designating switch, respectively. The switches 9b and 9c constitute a setting means in designating a scan range.

Figure 4:
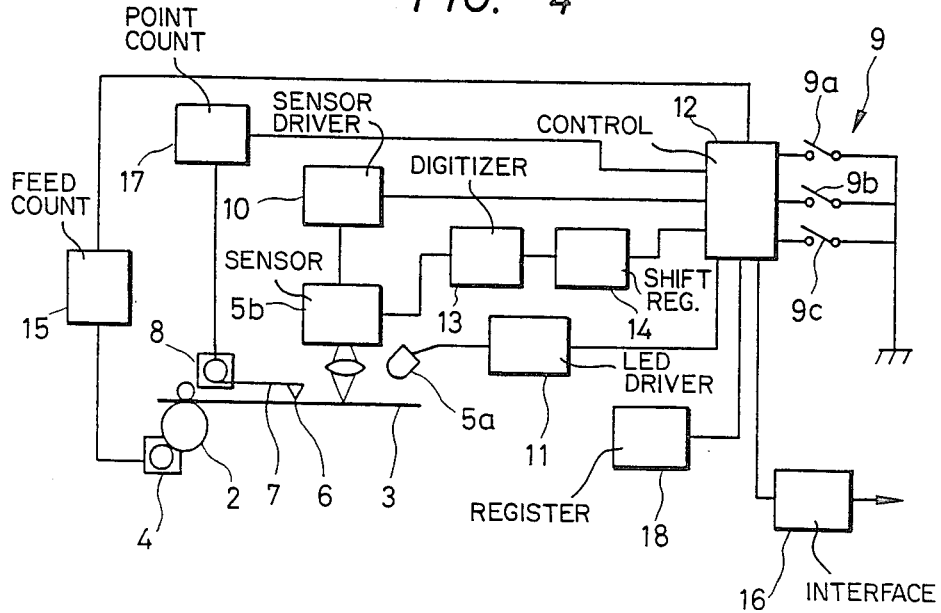
FIG. 4 is a circuit diagram of the image scanner.

Referring to FIG. 4 which shows a circuit diagram of the image scanner according to the present invention, reference numeral 10 designates a driving circuit for the sensor array 5b, and reference numeral 11 designates a driving circuit for the light emitter array 5a. The sensor array driving circuit 10 receives a switching timing generating signal from a control circuit 12, and each bit of the sensor array 5b operates to convert a quantity of reflected light from the original 3 into an electrical signal according to the switching timing generating signal. The electrical signal is inputted to a digitizer circuit 13, and is converted into a digital signal, which is in turn inputted through a shift register 14 to the control circuit 12. On the other hand, a paper feeding signal of the original 3 from the encoder 4 is inputted through a secondary scan counter 15 to the control circuit 12. Both the input signals are synthesized in the control circuit 12 to form an image data signal. The image data signal is transmitted through an interface circuit 16 to a host computer or the like, wherein such data is indicated by a display device, or it is stored by a memory device.

The image scanner of the present invention is designed to designate a scan range in the paper feeding direction of the original 3 as previously mentioned. Therefore, the encoder 8 is connected through a range designating counter 17 to the control circuit 12, so as to count the quantity of rotation of the encoder 8 and record same in a range designating register 18 connected to the control circuit 12.

Figure 5:
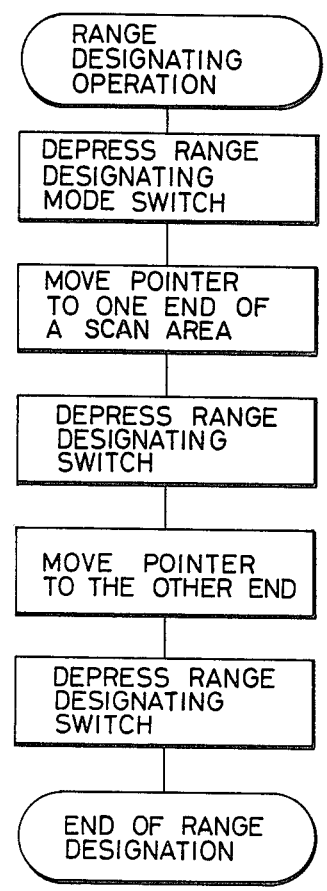
FIG. 5 is a flow chart showing a designating process of the scan range.

Referring to FIG. 5 which shows a designating process of a scan range of the original 3, the mode designating switch 9b is first depressed to select a scan range designating mode where the signal from the encoder 8 may be fed through the range designating counter 17 and the control circuit 12 to the range designating register 18. Then, the pointer 6 is moved to extend the wire 7 and accordingly rotate the encoder 8. The quantity of rotation of the encoder 8 is counted by the range designating counter 17, and a counted value is retained by the range designating counter 17. When the pointer 6 is moved to a scan starting position on the original 3, the read range designating switch 9c is depressed. As a result, the counted value retained by the range designating counter 17 is fed to the control circuit 12, and is stored in the range designating register 18.

Next, when the pointer 6 is moved to a scan ending position on the original 3, and the range designating switch 9c is depressed again, a counted value of the range designating counter 17 at this position is similarly stored in the range designating register 18. Thus, the scan starting position and the scan ending position are designated in the range designating register 18. Such as designating process may be conveniently conducted such that designation of the scan ending position may precede designation of the scan starting position by setting the scan starting position as a smaller counted value while setting the scan ending position as a larger counted value.

After designating the scan range in the manner as mentioned above, the start switch 9a is depressed to select an original scanning mode from the scan range designating mode. Simultaneously, the paper feeding roller 2 is operated to feed the original 3 on the original bed 1a into the scanning section 1b. When the scan starting position on the original 3 comes to a position opposed to the image sensor 5, the image sensor 5 is operated according to the signal from the range designating register 18 so as to scan the information on the original 3. Thereafter, when the scan ending position on the original 3 reaches the image sensor 5, the operation of the image sensor 5 is stopped according to the signal from the range designating register 18. Thus, the scanning operation is ended. According to the preferred embodiment, the information in the predetermined area S only may be scan, and scanning of any information in an unnecessary area may be eliminated. Further, it is conveniently possible to carry out high-speed scanning of the original 3 by operating the paper feeding roller 2 at high speeds in an area other than the scan range.

Furthermore, the signal processing regarding the designation of the scan range may be made greatly easy by equalizing the counted value of the scan range designating encoder 8 to the counted value of the secondary scan counter 15 with respect to a fixed amount of paper feed or a fixed distance in a secondary scanning direction.

Although the scan starting position and the scan ending position in the paper feeding direction of the original are designated in the foregoing embodiment, a scan range in the transverse direction of the original may be similarly designated. In this case, although the scan range may be designated by utilizing the encoder as mentioned above, it may be similarly designated by another means such as a slide volume.

Although the secondary scan encoder is provided independent of the scan range designating encoder in the foregoing embodiment, the former may be combined with the latter for common use. Further, the setting means may be formed by locating a switch or the like on the pointer itself or by contacting the pointer with the original bed, in substitution for the switches located on the scanner body 1.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. In an image scanner including an original bed in a plane, a feeding means for feeding an original placed on said original bed in a paper feeding direction, and an image sensor which is operated to scan across said original in a direction perpendicular to the paper feeding direction of said original as said original is fed by said feeding means in front of said image sensor, the improvement comprising:

a pointer moved in parallel to the plane of said original for pointing at a scan starting position and a scan ending position on said original;

an encoder for detecting a quantity of movement of said pointer between said scan starting position and said scan ending position, said encoder including a wire which is connected to said pointer and encoding means which is rotated with the movement of said wire by said pointer and provides a signal indicative thereof, said wire being wound up with said encoder when said pointer is not operated; and a setting means for setting a corresponding scan starting position and a scan ending position for the operation of said image sensor to scan said original according to the signal from said encoder.

* * * * *